United States Patent
Albert et al.

[15] 3,650,784
[45] Mar. 21, 1972

[54] AGGREGATE CONTAINING A TREATMENT AGENT FOR IMPROVING CONCRETE PROPERTIES

[72] Inventors: Robert J. Albert, Salem, N.H.; John H. Hoge, Cincinnati, Ohio

[73] Assignee: said Albert, by said Hoge

[22] Filed: Aug. 11, 1970

[21] Appl. No.: 63,022

[52] U.S. Cl.....................................106/90, 106/97, 106/314, 106/288 B, 259/147
[51] Int. Cl. .........................................................C04b 31/40
[58] Field of Search........................106/90, 97, 314; 259/147

[56] References Cited

UNITED STATES PATENTS

Re. 26,545 3/1969 Albert......................................106/97

*Primary Examiner*—Tobias E. Levow
*Assistant Examiner*—W. T. Scott
*Attorney*—Wolf, Greenfield & Sacks

[57] ABSTRACT

The internal capillary and pore spaces of porous lightweight aggregate are filled with a solution or suspension of a treating agent capable of improving at least one physical property of concrete. When this treated aggregate is used in the conventional manner in mixing and placing concrete, a treating agent remains absorbed within the aggregate and does not emerge to react or deposit in the concrete matrix until the moist curing, normally given to concrete, is terminated and the cast begins to dry. The treating agent is thus uniformly released throughout the interior of the cast at any time that is selected as optimum in the cement crystallization cycle for the particular property improvement sought in contrast to the relatively shallow penetration achieved by externally wetting the cast with such agents as in present art. A variety of organic and inorganic agents, many not heretofore usable by the conventional methods, can be incorporated in concrete to improve physical properties such as compressive, tensile and flexural strength, impermeability, freeze/thaw resistance and the like. Agents that would be rendered ineffective if introduced during mixing or in the early stages of hydration can now be utilized by this novel process.

31 Claims, No Drawings

3,650,784

AGGREGATE CONTAINING A TREATMENT AGENT FOR IMPROVING CONCRETE PROPERTIES

BACKGROUND OF THE INVENTION

Concrete is a material widely used in building, construction and other applications. This artificial stone usually consists of a suitably sized and graded mixture of rock and siliceous particles (sand) called aggregates, bonded together with cement. Most common cements are fusion or clinkering products of suitable clays and limestones. The anhydrous clinker, or glass, of such fusion is ground to an exceedingly fine powder state and when water is mixed with this powder, as in the course of making concrete, chemical hydration reactions take place and new crystal systems form. The formation and growth of the hydrate crystals from the original discrete anhydrous nuclei result in a rigidly interlocked crystalline mass or matrix. At interfaces with aggregates, the crystals tend to grow into every crevice and pore, mechanically locking such materials to the cement matrix which in turn becomes a lattice, or "seating" agent by virtue of filling the voids between particles and hardening to a rigid state.

As is well known, there are five major hydratable compounds in Portland cement and they react with water at different rates. Calcium silicates, which comprise the major fraction of cement, always react slowest, so that it is desirable that water be kept available to them to insure substantial completion of their hydration and crystalline development. It is also well known that the tricalcium silicate does not resume hydration if the reaction is interrupted by the exhaustion of the supply of water so that premature drying of the cement matrix or the concrete results in a permanently imperfect, incompletely integrated crystal structure with loss of strength proportionate to the hydration deficiency. Therefore, hydration, or moist curing, is normally maintained for 28 days (ASTM Designation C 31-55, Section 7) which is the accepted standard for development of the crystalline structure that will attain the rated strength of the cement matrix and of the resultant concrete.

Imperfection of the crystal structure has serious effects at the interfaces of the cement matrix and the aggregate particles. If the hydrate crystals do not fully form and substantially engage the surfaces of the aggregates, then when forces such as compression, tension, bending, shear and the like are applied to the concrete cast, they are not translated between matrix and aggregate properly and these forces must be borne largely by the cement matrix alone. Then only a fraction of the potential properties of the concrete are realized.

An enormous amount of research has gone into the study of treating agents or additives intended to improve physical properties of cement and concrete. Such additives are normally incorporated directly into the concrete mix and are usually the type that affect the hydration reaction of the cement or modify the spatial arrangement of the concrete components.

Some agents that would be useful to the concrete properties if added after the cement has partially or fully hydrated cannot be dispersed in concrete during mixing without diminishing their effectiveness due to premature reaction with the cement compounds, or because they adversely affect the course of cement hydration.

Some attempts have been made to introduce treating agents after the cement hydration has progressed, as by immersing the concrete cast or continually bathing it in a solution or suspension of the agent. Since most concretes are of low permeability, such soaking must be uneconomically prolonged, or the beneficial results are limited to a relatively small depth to which the agent penetrates. These and other problems have heretofore severely limited the commercial use of many agents that could improve concrete properties if only they could be uniformly dispersed in the cast at the proper time in the hydration cycle.

Some research has been done on the use of time delay coating of soluble solids and encapsulation of liquids in tiny slow dissolving films, aimed at releasing the thus buffered reagent at a selected time in the hydration cycle of the cement. The attrition of the mixing operation necessary in concrete practice has largely thwarted such approaches.

During the past 25 years the use of lightweight aggregates in the place of stone and gravel in concrete has significantly increased. The usual objective of this substitution is reduction in the weight of the finished concrete, generally of the order of 30–35 percent, which is an important consideration in roof, frame, wall panel, and floor elements of multistory structures. In general, the lightweight aggregates are not as strong in compression and shear properties as conventional stone aggregates, but they are strong enough for use in the range of concrete strengths required for most building purposes, i.e., 2,000–6,000 p.s.i. compressive strength.

The occurrence of natural lightweight rock is relatively scarce, so nearly all lightweight aggregates are processed materials. Shales, slags and clays are commonly used. The raw material is reduced to the desired size, or pelletized in the case of clay, and heated to softening point in a furnace. The softening permits the escape of the chemically combined water of crystallization from the mineral as superheated steam, which vapors literally blast the softened particle full of pores and capillary channels. The thus expanded material is quickly cooled back to rigid state, "freezing" the porosity into the particle.

In comparison to conventional stone aggregates, the porous lightweight aggregates can and do absorb substantial quantities of water, either when wetted or when used in wet slurries such as concrete. The extent of absorption usually ranges from 5–20 percent, depending on the type of aggregate, the duration of soaking, and other factors. Allowance is made for this in concrete practice by increasing the amount of water used over that required in making the concrete mix with conventional stone aggregate. Another approach is to presoak the aggregate to a level of absorption that will eliminate imbibation during mixing and placing. Such precautions are necessary to insure maintenance of workability, or "slump", of the fresh concrete. The presoaking procedure is more reliable and is widely used.

Prewetting or soaking the porous lightweight aggregate will usually result in less than half of the pore and capillary space being filled. A process for substantially totally filling the pore space with liquid is disclosed by R. J. Albert in U.S. Pat. No. Re. 26,545. Another method is to heat the aggregate with the above-described manufacturing furnace.

Water absorbed by a porous aggregate will remain substantially immobilized in the pore and capillary spaces during the mixing and placing of concrete in which such aggregate is used, because the fresh concrete is, itself, saturated with water. In this usual concreting practice, this saturated condition is maintained by moist curing, or at least preventing the evaporation of mix water from the cast, so that the water in the porous aggregate continues to be substantially immobilized. However, when the cast is permitted to begin drying, and the concrete matrix becomes unsaturated the water in the porous aggregate will migrate therefrom by capillary action. In concrete field practice, this extra supply of water prolongs the curing period, often with some attendant gain in the crystalline development of the cement.

It is an object of this invention to provide a method of improving physical properties of concrete containing porous lightweight aggregate.

Another object of this invention is to provide a method in accordance with the method of the preceding object which comprises filling spaces in porous lightweight aggregate with a solution or suspension of a treating agent that improves at least one physical property of the concrete, and to utilize said impregnated aggregate to make an improved concrete.

Still another object of this invention is to provide a porous lightweight aggregate for concrete compositions, which aggregate has internal capillary and pore spaces filled with a solution or suspension of a treating agent for improving one or more physical properties of the concrete, which solution or suspension of treating agent normally remains dormant and unreactive within the porous aggregate until the drying of the concrete cast causes it to migrate out into the concrete matrix and produce the desired improvement of property.

SUMMARY OF THE INVENTION

According to this invention, a porous lightweight aggregate has a plurality of internal spaces which are filled with a liquid carrying a treating agent capable of improving at least one physical property of concrete made with said aggregate. The amount of agent, or concentration, in the liquid which is preferably in solution or suspension can vary greatly and is determined by the amount of agent required to produce the desired property improvement and the amount of liquid that will be caused to be absorbed in the porous aggregate.

According to the method of this invention, physical properties of concrete containing porous lightweight aggregate are enhanced by filling interior spaces in the porous lightweight aggregate with a liquid. The liquid carries a treating agent for improving at least one physical property of concrete. The aggregate is utilized in a wet concrete mix which is permitted to cure and dry with the treating agent passing out of the interior spaces as the mix dries whereby at least one physical property of the final concrete is enhanced.

Porous aggregate particles containing the solution or suspension of treating agent in accordance with this invention are incorporated in any desired conventional concrete mix composition which is then mixed and cast by the usual concrete practices. The concrete cast is then subjected to whatever moist curing procedure has been selected as suitable for the conditions of the concreting. Upon partial or complete termination of the curing the concrete cast is allowed to dry by evaporating of the excess water from within its matrix. As the matrix dries, the treating agent solution or suspension begins to migrate from the interior of the porous aggregate in accordance with well-known physical laws, carrying the agent out of the aggregate to react with the intended compounds in the cement matrix, or to deposit in said matrix, producing the intended improvement to the concrete. Some improvement in the concrete can be obtained in the case of certain treating agents which may remain in the spaces and react or deposit therein.

In the practice of the process of this invention, the point in the hydration progress of the cement at which the user may cause the reaction or deposition to occur can be controlled, since the agent does not substantially emerge from the aggregate spaces so long as the cast is kept wet. Thus it requires only the commencement of drying of the concrete at any selected time after casting to inaugurate the desired reaction or deposition.

It is a unique and valuable feature of the invention that it provides a method for uniformly distributing treating agents throughout the entire concrete cast, and releasing them at a controllable time at a uniform, controlable rate. No practical and reliable prior art methods successfully accomplish this feature.

The process of this invention is not limited to the use of agents that react only with compounds naturally present in cement mixes. A second reagent, which must be of a type that does not react improperly with cement or aggregate compounds, can be included in the concrete mix, where it remains dispersed until the agent absorbed in the aggregate emerges to enter or catalyze a reaction. By this unique process many agents and compounds heretofore impossible to incorporate uniformly in a concrete cast can now be used effectively and economically.

A variation of the foregoing multiple reagent application it to utilize a suitable mixture of aggregates containing different treating agents. Such agents may be of the type that react with each other, or they may react with one or more cement compounds, or one may react while another merely forms a deposit.

The practice of this process does not require that all of the aggregate used in a concrete composition be porous lightweight material carrying treating agent. The aggregate fraction of the concrete can include a portion of conventional stone, especially if the weight of concrete is not critical. The amount of porous lightweight aggregate required need be only sufficient to contain the desired amount of treating agent.

The treating agents of this invention can be any material which enhances a physical property of the concrete. Such treating materials include dissolved or dispersed metal salts of, but not limited to, silicates, chlorides, carbonates, bicarbonates and sulfates. The treating agents can also be organic compounds and materials such as melamine resins, acrylic, polyvinyl chloride and acetate polymers and similar organic latices as well as, alcohols, glycols, ethylene polyoxides, urea-formaldehyde, organo silicones, vinylidene chloride and other useful compounds.

Preferably the solvent or liquid vehicle is water and the treating agents form solutions or suspensions in the water.

It is a feature of this invention that the treating agent and liquid are maintained in the spaces, i.e., the pores and capillaries, of the porous lightweight aggregate during hydration of the cement and do not pass into the concrete matrix until the water initially incorporated in the concrete mix composition, together with any water added by curing, leaves the cast, i.e., the concrete is allowed to begin drying, usually after substantial hydration of the cement has occurred. Thus the treating agent becomes available to the cement matrix after the crystal lattice is well formed.

DESCRIPTION OF PREFERRED EMBODIMENTS

Conventional, porous lightweight aggregates are useful in making improved concrete in accordance with this invention and are well known in the concrete art. Such porous lightweight aggregates are defined by ASTM Designation C 332-56 T. In addition to sintered slag, clay, shale, slate, diatomite and the like, natural materials such as scoria, tuff and pumice can be used, as well as synthetic porous aggregates made by partial fusion of compacted pellets of fly ash, alumina, glass powder and similar materials. All such aggregates are characterized by a plurality of spaces comprising pores or voids and capillary channels, making them substantially absorbent. In most cases, the spaces communicate with the surface of the aggregate through capillary channels or other openings. The aggregate can be used in particle forms of various sizes ranging from 2 inch to nominal sand grading fineness modulus of about 2.4. Other particle sizes can be used.

Preferably, the porous aggregate has an internal void volume of 20–40 percent of the volume of the particles of the aggregate, but porosity above or below this range can be utilized effectively by adjusting the concentration of treating agent in the liquid to be absorbed by the aggregate. Thus, for example, an aggregate that can absorb 40 percent of its volume in liquid could be filled with a 2 percent solution of treating agent for a given result, while one that can absorb only 10 percent volume might have to be filled with 8 percent solution to yield the same quantity of agent in the concrete mix.

Several methods are available for filling the spaces of the porous lightweight aggregate with the solution or suspension of treating agents of this invention. One particularly desirable method is discussed in U.S. Pat. No. Re. 26,545 issued Mar. 11, 1969 to Robert J. Albert. This patent discloses a vacuum treatment of the porous lightweight aggregate. In this preferred method, porous lightweight aggregate is subjected to a vacuum as of from 26 to 30 inches of mercury and preferably at least 28 inches of mercury for a period of time sufficient to substantially remove all gases which fill the internal spaces of the aggregate. These spaces comprise capillary channels communicating with the surface of the aggregate and void spaces within the body of the aggregate particles. Preferably while maintaining the vacuum, water, or, in the practice of the present invention, any other liquid carrying the required treating agent, is fed into the vacuum chamber in an amount sufficient to inundate the aggregate and leave it inundated after the vacuum is released. The liquid flows and substantially fills all the pores and capillaries of the aggregate. The term "fill" as used herein refers to complete as well as partial filling of the spaces. The excess treating agent solution is then drained and the resultant saturated aggregate is ready for immediate use in a concrete mix. The water or other liquid carrying the treating agent can be introduced prior to vacuum application. The vacuum is then applied to evacuate gases from the aggregate spaces and fill the spaces. The aggregates need not be used immediately if it can be stored in an atmosphere maintained sufficiently moist to prevent drying of the aggregate. Storage at ambient conditions for long periods of time results in some degree of deposition of the treating agent in the capillary channels at or near the surface of the aggregate. Part of such deposits are washed back into the aggregate when it is used in concrete mix and part is dispersed during mixing.

Another method of filling a high percentage of available void space in the aggregate with treating agent solution or suspension is to heat the aggregate to temperatures of 350°–600°F. and immediately submerge it in the said treating agent solution or suspension. The ensuing gas law cooling-contraction will result in substantial filling of the voids. This method is particularly useful and economical when used as a final step in the aggregate manufacture, since the material is already at the required temperature. The hot method cannot be used with treating agents that would be altered or damaged by the high temperatures.

Since porous lightweight aggregates will absorb substantial liquid even when immersed at ambient conditions, this simple economical method can also be used to incorporate the treating agent solution or suspension in the voids and capillary spaces. The lower degree of absorption, compared with the vacuum and hot method, can be compensated by using stronger concentrations of solution or suspension so as to yield as much treating agent as would larger volumes of more dilute solutions or suspensions.

The concrete mixes useful with the aggregates of this invention can be any of the standard concrete mixes. Cements such as Portland cement and other cements can be used. Non-porous aggregates such as sand, stone and the like and mixing water can be used. The amounts of each of the components of the concrete mixes can vary greatly as known in the art. In most cases, the treated porous aggregate of this invention is used as the entire structural aggregate component; however, small amounts of the treated aggregate can be used to provide desired release of the treating agent in the concrete and additionally give some structural support along with non-porous aggregate. The lightweight porous aggregate of this invention can be added to concrete mixes and mixed in conventional concrete mixers and the like. The cement can then be cast as normally done in various shapes as desired. The concrete mix is permitted to moist cure and then allowed to dry, usually at atmospheric conditions. The specific times and temperatures for curing and drying of the concrete can vary greatly as known in the art.

The liquid most preferred as the solvent or vehicle for treating agent solutions or suspensions of fine solids is water. Liquid organic compounds may also be used as a solvent or vehicle. Ethylene glycol or other alcohols and other organic solvents can serve as vehicles for treating agents insoluble in water, either as pure liquids or in emulsion combinations.

Treating agents capable of improving one or more properties of concrete according to this invention can be organic or inorganic compounds and materials. Such agents can be soluble in a vehicle liquid or can be carried in finely divided state in liquid suspension.

Organic agents include, but are not limited to, polyvinyl acetate, acrylate, polyvinyl chloride and similar polymer latices, alcohols, ethylene glycol, resin suspensions or solutions such as melamine or urea-formaldehyde, ethylene polyoxides and the like.

Organic compounds, in general, retard the rate of hydration of Portland cement compounds, a generally unfavorable characteristic for concreting operations. For this reason, many potentially useful agents cannot be utilized by the present art methods since it requires that the agent be included in the concrete composition at the time of mixing. In the method of the present invention, the agent is secreted in the porous aggregate, where it cannot affect the hydration-crystallization process, and it is permitted to emerge only at a time in the cycle best suited to the beneficial action sought.

The following examples of organic treating agents suitable to the process of the present invention are briefly described with regard to the concrete property improvement sought.

Ethylene glycol and the lower organic alcohols can be used as the treating agents in a liquid vehicle to increase the freeze-thaw resistance of concrete, thus reducing the damage that might occur during cold weather placement. When dry porous aggregate is used in conventional concreting practice, it absorbs water from the wet mix, hence localizes or "concentrates" water in its void space. When this water freezes, the expansion forces fracture the aggregate and even the surrounding cement matrix. If antifreeze agents, such as alcohols or glycol, are added directly to the concrete composition during mixing, the hydration and crystallization of the cement is impaired by the additive, with loss of ultimate strength. The process of this invention provides the means to protect the aggregate from freeze attrition, without interference to the hydration of the cement.

Melamine resins in aqueous suspensions coalesce to form hard dense deposits when the water is removed. They can be used as treating agents in the process of this invention to substantially increase the compressive strength of concrete, and to reduce absorptivity. The porous aggregate is saturated with a suitable melamine suspension such as an aqueous suspension, and used in the desired concrete mix. When the set cast is allowed to begin drying, the resin particles migrate from the aggregate, and coalescence takes place in voids in or adjacent to the aggregate particles. This deposition partly or wholly fills the minute voids that normally occur in a concrete matrix, such as between the cement matrix and the aggregate particles, as a result of the slight drying shrinkage of cement. Some resin also deposits in voids of the aggregate particles. These filling and bridging depositions strengthen both the aggregate and the cement-aggregate bond, substantially increasing the concrete strength.

Alkyl acrylate latices when used as the treating agent yield a coalescing polymer that is somewhat more elastic and less hard than the melamines. Accordingly, they markedly improve tensile and flexural strength; compressive strength is also improved, but to a lesser extent than by melamines.

Polyvinyl chloride and acetate latices are elastomeric polymers and are used as treating agents in the method of this invention to improve the tensile strength and elastic modulus of concrete. The deposits of such polymers adjacent to the surface of the aggregate particles are thought to act as arresting media to crack propagation and to give increased resistance to flexural stress.

All latices, when used as treating agents in the method of this invention render the porous aggregate and much of the concrete matrix substantially impervious to water once they have coalesced. This reduction in the normal absorptivity of lightweight aggregate concrete limits the dead weight of water the dried cast can regain during soaking conditions. Low absorptivity in concrete also reduces the damage potential of freeze-thaw cycle conditions of exposure.

Organic resins have much the same property range as the latex polymer compounds, but being usually of smaller molecular chain length, hence particle size, they will diffuse farther into the cement matrix than will polymers during drying. Water soluble resins such as ethylene polyoxides are used as "water thickeners", and in the process of this invention are used to drastically slow down the rate of water migration from the aggregate particles through the cement matrix. This, in turn, can greatly prolong the availability of water to the hydrating cement, an important consideration for curing under adverse, dry field concreting conditions, if the design strength of the concrete is to be attained.

Organo silicon solutions and organo halosilanes of the type normally applied as waterproofing coatings to fully cured concrete are even more effective when used in the method of this invention as treating agents. The process disperses the agent throughout the entire cast, in contrast to the shallow, perishable surface film obtained by current practice.

The process of this invention can further be utilized to produce controlled polymerization within the matrix of the concrete so as to greatly enhance the compressive strength. An example of such an in situ reaction is to disperse a suitable amount of a polyhydric phenol, such as resorcinol or phloroglucinol, in the concrete composition to be mixed. The porous lightweight aggregate used is presaturated with a solution of an aldehyde, such as formaline or paraformaldehyde, of sufficient concentration to provide a slight excess of this agent (about 2.5 moles per mole of polyhydric phenol). When the aldehyde is caused to migrate from the porous aggregate, i.e., when drying the cast begins, the reaction of the copolymers is rapid even at moderately low temperatures. The strength and densification of the phenol formaldehyde resin thus formed within the concrete matrix contributes greatly to the strength of the finished product.

Inorganic treating agents useful in the practice of the present invention are numerous, and may be broadly characterized by the compound in the cement or concrete composition affected by their addition. Examples of inorganic treating agents include particularly, but are not limited to, metal salts of silicates, carbonates, bicarbonates, chlorides and sulfates. The metallic ions can for example be sodium, potassium, lithium, barium, strontium, copper or zinc.

For reactions with the excess lime normal to hydrated Portland cement, a preferred treating agent is soluble potassium silicate having a silicate to alkali mole ratio of 2.2 to 3.6. The preferred amount of soluble silicate is from 2 to 6 percent of the weight of cement to be used in the concrete composition, and the strength or concentration of the silicate solution used to fill the porous lightweight aggregate will be governed by the amount of solution that the aggregate will be made to absorb. For example, using a vacuum process hereinbefore described, a given porous aggregate will absorb the treating agent solution to the extent of 40 percent of its own dry weight. For a concrete mix design using 900 lb. of aggregate and 500 lb. of cement per cubic yard of concrete (and suitable weights of sand and water), if 2 percent soluble silicate on the basis of cement is desired, the solution saturating the aggregate must contain 500×0.02 or 10 lb. of silicate. The aggregate will imbibe 0.40×900, or 360 lb. of water, so the correct concentration of silicate solution must be 10/360, or 2.75 percent by weight.

Soluble silicates react rapidly with lime to precipitate exceedingly fine monoclinic crystals that are insoluble and stable in water. The excess lime in hydrated Portland cement is not only soluble, being the source of whitish discolorations often seen on concrete casts, but it is also recognized as a primary source of crystal structure changes that cause spalling on the surface of the concrete cast. Lime is known to localize strongly at the interface of aggregate and cement matrix, especially in the shrinkage crevices that characteristically occur at these points in concrete. By the process of this invention, these flaws in the concrete matrix are substantially corrected. After hydration is completed to the desired level, and the cast is allowed to begin drying, the soluble silicate solution migrates from the porous lightweight aggregate and the agent reacts with the lime at the cement-aggregate interface. The calcium silicate precipitate thus formed occupies more space than the lime alone did, and the new monoclinic crystals bridge the voids between cement matrix and aggregate, improving the stress transfer capabilities of the concrete cast and improving the compressive strength. As the migration of any unreacted silicate solution continues toward the surface of the cast, all or a portion of the excess lime in the entire concrete cast will be converted in situ to stable calcium silicate.

Soluble carbonate and bicarbonate salts, such as sodium carbonate, when used as the treating agents, also react with lime, in this case forming calcium carbonate, or limestone. By the process of this invention, concrete casts can be uniformly carbonated at any point in the hydration cycle. Carbonation gives improvements in concrete strength of 10–25 percent, reduces the porosity of concrete, and eliminates the excess lime.

The calcium aluminate compounds of cement are known to react with sulfate salts to form calcium sulfoaluminate. Since the crystal size and volume of the sulfoaluminate is greater than the parent aluminate, this reaction produces an internal thrust or expansive force on the cement crystal lattice if it is made to occur after the lattice has become rigid from hydration. An adverse example of this expansion reaction is the deterioration of concrete exposed to sea water or ground water containing sulfate salts. Much research has gone into attempts to utilize this crystalline expansion of aluminates to offset the characteristic shrinkage of the silicate crystal lattice in hydrated cement. Bathing or soaking the set concrete cast with sulfate solution is ineffective because the reaction and expansion begin on the surface of the cast instead of uniformly throughout, so the surface layers simply spall off, as with sea water deterioration. The addition of sulfate salt in the mixing stage of concrete is ineffective because sulfates severely retard the cement hydration reaction and furthermore the desired sulfoaluminate formation and expansion occurs before there is any hydrated silicate lattice to compress. By the process of the present invention, a controlled amount of a suitable metallic sulfate salt is used as the treating agent and released uniformly throughout the cement matrix at the optimum point in the hydration cycle so as to react with the calcium aluminates to form calcium sulfoaluminates, whereby the desired degree of expansive force is exerted throughout the entire crystal lattice. The expansion thus generated can be predetermined so as to equalize the normal shrinkage of the cement lattice, or it can even be increased so as to result in a net expansion of the concrete cast. The amount of soluble sulfate salt treating agent required varies with the composition of the cement being used and with the degree of expansion desired, but a range of 1–6 percent of the weight of cement being used in the concrete mix has been found useful in the present invention.

Calcium chloride is a well known accelerating agent for cement hydration when added during the mixing of concrete, but in this capacity it does not significantly affect the strength of the concrete. Improvements in strength of the magnitude of 25 percent have been demonstrated in concrete cured by immersion in 4 percent calcium chloride solutions. The gain in strength is thought to derive from sustaining the acceleration throughout the hydration cycle, thereby producing a finer textured, more uniform crystal structure. The process of the present invention permits the necessary diffusion of calcium chloride, when used as the treating agent, uniformly throughout the concrete cast without the inconvenience of submersion or continuous bathing, and results in a concrete having improved compressive strength.

Chloride salts of copper and zinc when used as the treating agent, reduce or eliminate the normal dry shrinkage of cement. It has not been established whether they affect the silicate shrinkage itself, or whether they cause a crystal thrust by means of a metal ion exchange or addition in the calcium ferro aluminate compound of cement. Like sulfate salts, copper and zinc chloride are strong retardants to cement hydration and their addition to freshly mixed concrete is generally undesirable in commercial practice. However, if they are present from the beginning of hydration, the expansion action is exceedingly difficult to control. Bathing or immersing the concrete cast in the salt solution is seldom practical for field concreting. The process of the present invention, however, permits uniform, rapid diffusion of the desired amount of copper or zinc chloride throughout the well-developed cement crystal lattice so that the expansion action occurs almost concurrently with the normal drying shrinkage, producing an improved stable, stronger concrete, substantially, free of shrinkage cracks.

The foregoing examples constitute only a few of the additive treating agents useful in improving the properties of concrete. The process of the present invention is not concerned with agents that must be present in the concrete composition at the time of mixing in order to be effective, such as accelerators, retarders, water reducing agents, air entraining agents and the like. In the method of the present invention, the useful treating agent employed is intentionally restricted from the concrete matrix so as not to alter the normal hydration/ crystallization cycle of the cement, even though uniformly dispersed throughout the concrete cast. The time or point in the hydration cycle at which the agent is released to the concrete matrix is controllable, and upon such release, the uniquely dispersed agent begins its intended function uniformly and simultaneously throughout the entire concrete cast. This feature enhances the effectiveness of the agent, and in many cases is absolutely essential to achieving the desired property improvement in the concrete. This process makes possible the effective application of treating agents some of which are known to be beneficial but heretofore unusable for lack of a method to introduce them throughout the concrete uniformly at the proper time.

The following examples are illustrative of the improvement in compressive strength obtained by the process of this invention.

Example I is concrete made with aggregate "as received", hence is typical of present art practice for making lightweight concrete.

Example II is concrete made with aggregate vacuum saturated with plain water, no treating agent being involved.

Example III is concrete made with aggregate vacuum saturated with a water solution of 2 percent by weight potassium silicate of 2.5 mole ratio silicate to $K_2O$, and a specific gravity of 1.25 (29.8° Be).

Example IV is concrete made with aggregate vacuum saturated with a water solution of 4 percent calcium chloride by weight.

The vacuum saturation is carried out under 29.5 inches mercury, by the process described in the R. J. Albert patent, U.S. Pat. No. Re. 26,545. Thus, the aggregate is subjected to the vacuum, and then flooded with water or the treating agent solution after which the water or solution is preferably immediately drained.

|  | I | II | III | IV |
|---|---|---|---|---|
| Portland Cement, Type I, lb. | 505 | 505 | 505 | 505 |
| Sand, Ottowa Shot Grade, dry lb. | 1000 | 1000 | 1000 | 1000 |
| Porous Aggregate, dry basis lb. | 910 | 1000 | 1000 | 1000 |
| Imbibed Treating Agent Solution, lb. | 0 | 395 | 254 | 395 |
| Mix Water, lb. | 278 | 260 | 260 | 260 |
| Wet Density, pcf | 104.0 | 116.0 | 111.0 | 116.8 |
| Air Dry (Test) Density pcf | 96.4 | 98.0 | 98.6 | 98.4 |
| Compressive Strength, p.s.i. | 3320 | 3550 | 4110 | 3620 |

The materials used in all tests were taken from the same lot, to eliminate variations in sand, cement and aggregate properties. The porous lightweight aggregate used was expanded clay commercial grade representative of such materials and meeting ASTM specification 330-69. Its bulk density was 43 pcf, and its specific gravity 1.10; its water absorption by simple immersion was 11 percent by weight at 2 hours, 16.5 percent at 48 hours and 38 percent by the vacuum process at 28.5 inches mercury. Vacuum saturation was used to fill the aggregate with the liquids used in Examples II, III and IV.

All of the concretes were mixed and cast by identical procedures typical of conventional concreting practice. Standard 3×6 inch test cylinders were taken of each mix, and were moist cured 28 days at 72°F. followed by air drying at ambient conditions for 21 days, then tested in compression by standard ASTM procedure. The moisture content of the samples at the time of testing ranged from 1.76 to 2.11 percent, Example I being the driest.

The mix proportions used were selected to give nearly equal oven dry final densities to the concretes, since it is well known that strength generally is increased by increasing density. Correction of the test densities of the above data to oven dry basis did, in fact, bring the densities to plus or minus 0.5 pcf equality. For Example I, the amount of mix water used was arbitrarily determined so as to give a slump, or standard of workability, identical to the other test concretes, i.e., 3 inches slump. The weight of treating agent solution imbibed by the potassium silicate treated aggregate (Example III) was less than for Examples II and IV, because this particular aggregate gave a reaction with the silicate that precipitated crystals in the aggregate capillary channels; this blocked further imbibition. Tests of all vacuum saturated aggregates under 100 lb. hydraulic pressure, however, showed that no more liquid could be forced or vacuumed into them.

To complete the comparison, Example I was repeated but with the addition of 5 lb. of potassium silicate agent (equal to the amount present in Example III) directly to the mix composition. The final compressive strength of this concrete was only 3,115 p.s.i., clearly showing that the method of introducing this treating agent is the primary factor in property improvement.

As clearly seen from the tables, Example III and IV containing treating agents in accordance with this invention have increased compressive strength as compared with the use of dry aggregate and aggregate saturated with plain water.

While specific examples of the means and methods of this invention have been described, many variations are possible. For example, two or more treating agents can be used in a liquid vehicle to fill the spaces of porous lightweight aggregate. The specific times and temperatures necessary for use in the method of this invention can vary greatly with any normally encountered atmospheric conditions normally used for curing and drying cement being useful as well as conditions normally used in concrete, brick or other structures also being useful. It is only necessary to avoid temperatures which are degrading to the treating agents and cement used. The specific amounts of treating agent, vehicle and other components of the cement mix can vary greatly depending upon the properties desired and the particular components used.

We claim:

1. A method of improving a physical property of concrete, said method comprising,
    filling interior spaces in a porous lightweight aggregate with a liquid,
    said liquid carrying a treating agent for improving a physical property of concrete,
    mixing the resulting aggregate in a concrete mix,
    and permitting said mix to cure and dry with said treating agent passing out of said interior spaces as said mix dries whereby said physical property is enhanced.

2. A method in accordance with the method of Claim 1 wherein said aggregate is utilized in said concrete mix by mixing therewith and said concrete mix comprises cement, sand and mixing water along with said aggregate.

3. A method in accordance with the method of claim 2 wherein said concrete mix further comprises a second treating agent reactive with said first-mentioned treating agent.

4. A method in accordance with the method of claim 2 wherein said filling of said interior spaces is carried out by replacing gases in said interior spaces by surrounding said porous lightweight aggregate with said liquid.

5. A method in accordance with the method of claim 4 wherein said replacing is carried out by exposing said aggregate to a vacuum.

6. A method in accordance with the method of claim 2 wherein said liquid is water.

7. A method in accordance with the method of claim 5 wherein said treating agent is selected from the group consisting of metal salts of silicates, carbonates, bicarbonates, chlorides and sulfates.

8. A method in accordance with the method of claim 5 wherein said treating agent is an organic material.

9. A method in accordance with the method of claim 5 wherein said treating agent is a metallic silicate soluble in said liquid.

10. A method in accordance with the method of claim 5 wherein said treating agent is a metallic carbonate soluble in said liquid.

11. A method in accordance with the method of claim 5 wherein said treating agent is a metallic bicarbonate soluble in said liquid.

12. A method in accordance with the method of claim 5 wherein said treating agent is a metallic chloride.

13. A method in accordance with the method of claim 5 wherein said treating agent is a metallic sulfate soluble in said liquid.

14. A method in accordance with the method of claim 2 wherein said treating agent is in a solution with said liquid.

15. A method for improving a physical property of concrete, said method comprising,
wetting a porous lightweight aggregate with a liquid so as to fill interior spaces in said porous lightweight aggregate and said liquid carrying a treating agent for improving a physical property of concrete,
mixing the resulting lightweight aggregate in a concrete mix comprising sand, cement and mixing water,
casting and curing said concrete mix,
and permitting said concrete to dry to cause said liquid and treating agent to pass out of said interior spaces of said porous lightweight aggregate whereby said physical property is enhanced.

16. A porous lightweight aggregate for use in concrete, said porous aggregate having a plurality of internal spaces,
said spaces being filled with a liquid carrying a treating agent for improving physical properties of concrete.

17. A porous lightweight aggregate in accordance with claim 16 wherein said liquid is water.

18. A porous lightweight aggregate in accordance with claim 17 wherein said treating agent is selected from the group consisting of metal salts of silicates, carbonates, bicarbonates, chlorides and sulfates.

19. A porous lightweight aggregate in accordance with claim 17 wherein said treating agent is an organic material.

20. A method in accordance with the method of claim 4 wherein said treating agent is an organic material.

21. A method in accordance with the method of claim 4 wherein said treating agent is a metallic silicate soluble in said liquid.

22. A method in accordance with the method of claim 4 wherein said treating agent is a metallic carbonate soluble in said liquid.

23. A method in accordance with the method of claim 4 wherein said treating agent is a metallic bicarbonate soluble in said liquid.

24. A method in accordance with the method of claim 4 wherein said treating agent is a metallic chloride.

25. A method in accordance with the method of claim 4 wherein said treating agent is a metallic sulfate soluble in said liquid.

26. A porous lightweight aggregate in accordance with claim 16 wherein said treating agent is a metallic silicate soluble in said liquid.

27. A porous lightweight aggregate in accordance with claim 16 wherein said treating agent is a metallic carbonate soluble in said liquid.

28. A porous lightweight aggregate in accordance with claim 16 wherein said treating agent is a metallic bicarbonate soluble in said liquid.

29. A porous lightweight aggregate in accordance with claim 16 wherein said treating agent is a metallic chloride.

30. A porous lightweight aggregate in accordance with claim 16 wherein said treating agent is a metallic sulfate soluble in said liquid.

31. A method in accordance with the method of claim 4 wherein said porous lightweight aggregate is heated to temperatures of from 350° to 600° F. and is then surrounded by said liquid whereby said interior spaces are filled.

* * * * *